Aug. 30, 1938.                E. F. RIESING                2,128,733
                            RESILIENT SUPPORT
                         Filed Feb. 27, 1937              2 Sheets-Sheet 1
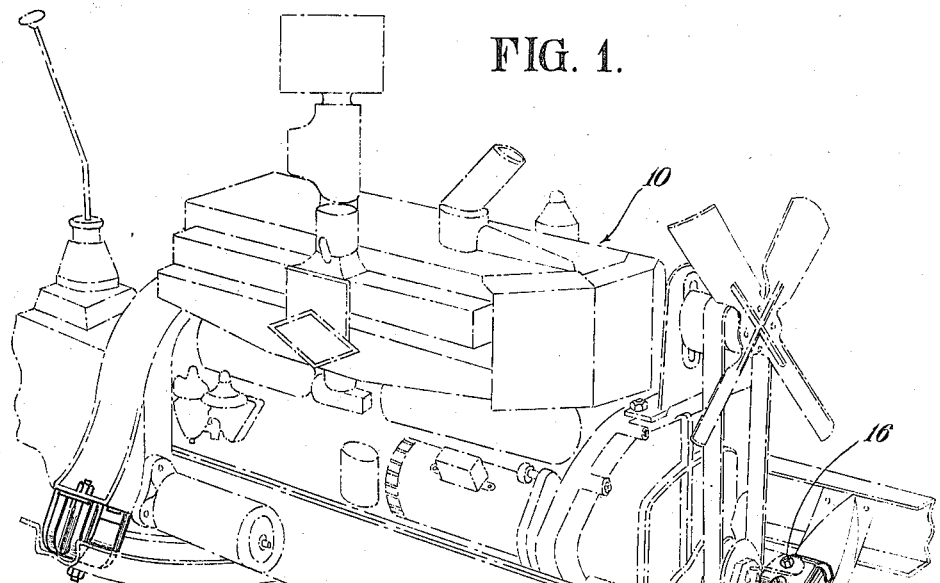
FIG. 1.
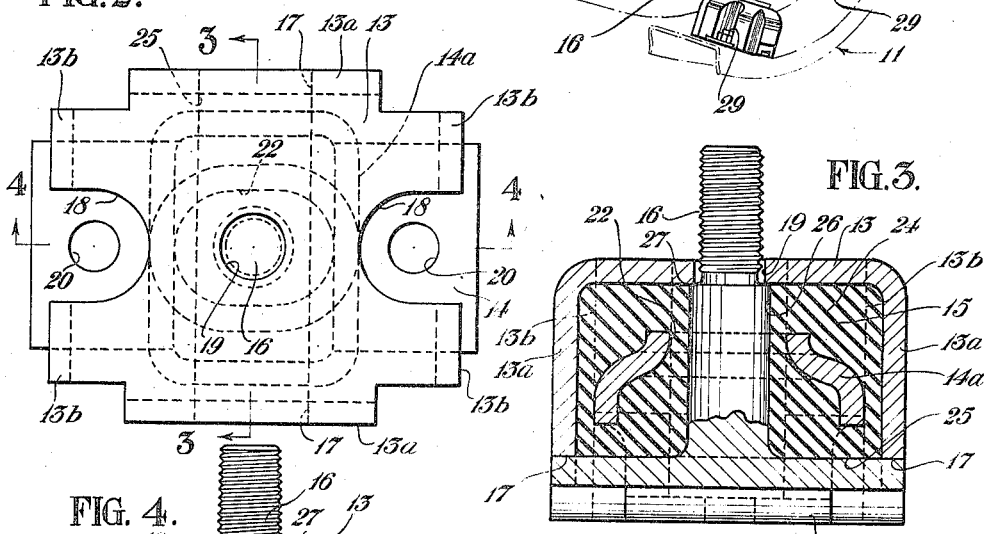
FIG. 2.    FIG. 3.
FIG. 4.
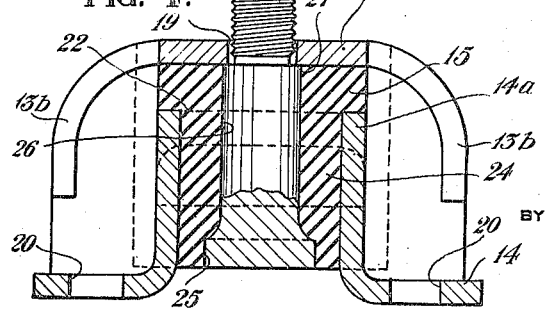
INVENTOR
Ellwood F. Riesing
ATTORNEY Patented Aug. 30, 1938

2,128,733

UNITED STATES PATENT OFFICE 2,128,733

RESILIENT SUPPORT

Ellwood F. Riesing, Akron, Ohio, assignor to The Firestone Tire & Rubber Company, Akron, Ohio, a corporation of Ohio Application February 27, 1937, Serial No. 128,169

4 Claims. (Cl. 248—9)

This invention relates to resilient supports, and more especially it relates to resilient motor mountings of rubber and metal, such as are used between the engine and the chassis of a motor vehicle to absorb and dampen the vibration of the engine.

The chief objects of the invention are to provide an improved support of the character mentioned that yieldingly will resist torsional vibration, vertical and lateral vibration, and fore and aft vibration parallel to the axis of the motor; that comprises elements of metal that are so interlocked as to retain the motor in proper position even though the rubber of the mounting becomes entirely detached from the metal structure, due to accidental or fatigue break-down; to provide a motor mounting of the character mentioned which permits but a restricted amplitude of movement between supporting and supported structures; to provide a resilient mounting construction which will offer an increasing rate of resistance to all vibratory movements of the engine; and to provide a resilient support of the character mentioned wherein the resilient element will be subject to compressive, tensile, and shearing strains under all phases of operation. Other objects will be manifest as the specification proceeds.

Of the accompanying drawings:

Figure 1 is a perspective view of a vehicle engine, a fragmentary portion of a vehicle chassis, and a plurality of the improved resilient supports operatively interposed between the said engine and chassis;

Figure 2 is a plan view of the improved resilient support;

Figure 3 is a section on the line 3—3 of Figure 2;

Figure 4 is a section on the line 4—4 of Figure 2; and

Figure 5:
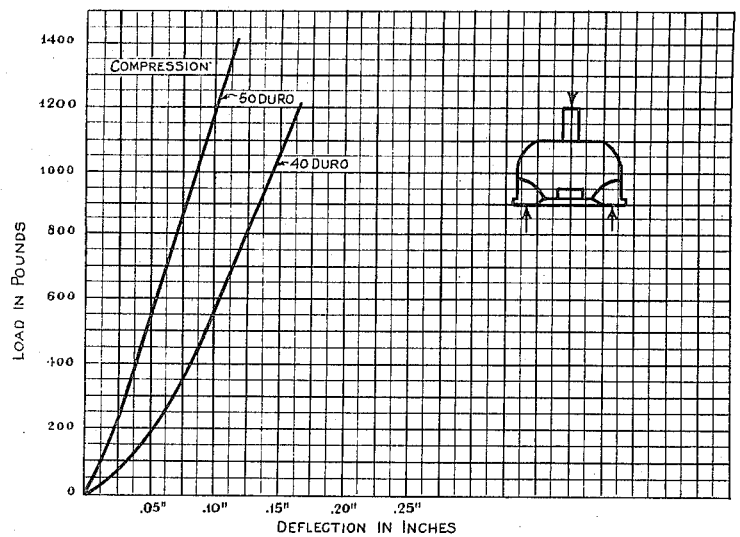
Figures 5 and 6 are graphs showing how the rate of resistance to deformation of the support progressively increases both in the compression and tension phases of operation respectively.

Referring to the drawings, there is shown in Figure 1 a typical installation of the improved resilient support, a plurality of the latter being shown operatively interposed between a vehicle motor 10 and the chassis or frame 11 of the vehicle. Although the resilient support at the rear of the motor is shown in inverted position with relation to the supports at the front of the motor, such arrangement is merely a matter of expediency and the supports function substantially equally as well in either position. In the following description of the resilient support, it will be assumed that the normal position thereof is that shown at the front of the motor.

As shown in Figures 2 to 4 of the drawings, the improved support comprises an upper metal member 13, a lower metal member or insert 14, a body of resilient rubber composition 15 vulcanized to each of said metal members, and a removable T-shaped bolt 16 extending through the metal and rubber structure and interlocking the metal members 13 and 14. The upper metal member 13 is an open box-like structure having a flat top, and at two opposite sides is formed with perpendicular, downwardly extending side-walls 13a, 13a, the bottom margins of the latter being centrally formed with respective rectangular recesses or notches 17, 17. Each of the other two sides of the metal member 13 is formed with a pair of arcuate, downwardly extending finger-like portions 13b, 13b, the ends of which are disposed somewhat above the lower margins of side-walls 13a. The adjacent lateral margins of each pair of finger-like portions 13b merge at their upper ends in a curve 18, most clearly shown in Figure 2. The flat top of member 13 is formed with a centrally disposed aperture 19.

The lower metal member or insert 14 is substantially rectangular in plan, and has its opposite end portions formed with respective bolt holes 20, 20 that receive the bolts that secure the structure to a supporting member, such as a vehicle chassis. In longitudinal side elevation, the insert 14 presents a bridge-like appearance in that its medial region is offset upwardly from the plane of the end portions thereof. Said offset medial region, designated 14a, is shaped something like an inverted cup, and is generally rectangular in plan with its longer sides disposed transversely of the insert and its ends projecting beyond the lateral margins of the end portions of the insert, as is most clearly shown in Figure 2. The side-walls of the bridge portion 14a are perpendicular to the end portions of the insert, as shown in Figure 4, and said bridge portion is formed with a centrally disposed aperture 22 that is elongate in the direction of the long dimension of the insert, and extends completely across said bridge portion, as shown in Figures 2 and 4. The insert 14 is so disposed relatively of the upper metal member 13 that the apertures 20 of said insert 14 are in axial alignment with the respective arcs 18 between the finger-like portions 13b at opposite sides of the member 13.

Positioned between and vulcanized to each of the metal members 13, 14 is a body of resilient rubber composition 24, the latter supporting the upper metal member 13 somewhat above the metal member 14, and in laterally spaced relation to all sides of the bridge portion 14a of the latter. As viewed in plan (Fig. 2) none of the rubber of the support is visible for the reason that the profile of the rubber, in a horizontal plane, is identical with that of the upper metal member 13. The bottom of the rubber structure 24 is flush with the bottom face of the end portions of insert 14, and follows the curvature of said end portion, where they adjoin the bridge portion 14a, the medial region of the bottom face of the rubber following the profile of the bottom margins of the end walls 13a of the metal member 13, so as to provide a transverse recess or slot 25 that is in alignment with recesses or notches 17 in said end walls. Coaxially arranged with relation to aperture 19 in upper metal plate 13 is a vertical bore or aperture 26 that extends completely through rubber structure 15 and opens into slot 25 at its lower end, said bore extending through aperture 22 of the bridge portion 14a of metal insert 14. The bore 26 is slightly larger in diameter than aperture 19, so that there is a shoulder 27 at the upper end of the bore where the member 13 overhangs the same. Receivable in bore 26 and slot 25 is the T-shaped bolt 16, the respective end portions of the cross-piece of the latter being received in the notches 17 in the side walls 13a of metal member 13. The threaded portion of bolt 16 projects through aperture 19 of metal member 13, and at the base of said threaded portion the bolt is formed with a shoulder that is engageable with the shoulder 27 of the bore 26.

The bolt 16 is utilized for attaching the supported member, such as the vehicle engine 10, to the resilient support, the arrangement being such that tightening of the bolt cannot have any effect upon the pressure exerted upon the rubber of the support. The support is secured to a supporting member, such as the vehicle chassis 11, by means of bolts 29, Figure 1, that extend through the apertures 20 in the metal insert 14 of the support. Because the cross-piece of the T-shaped bolt 16 extends beneath the bridge portion 14a of the insert 14, there is such an interlock of the metal members of the support as positively to prevent separation of a supported and a supporting structure even upon complete failure of the rubber element 15.

In the operation of the improved support, when relative movement between a supported and a supporting member is such as to move the upper metal member 13 downwardly toward insert 14, that portion of the rubber structure that is disposed between the top of the bridge structure 14a and the metal member 13, and that which is disposed below the finger-like portions 13b will be subjected to a compressive load, a small portion of the rubber at the sides of the bridge structure being subjected to tension and shear strains. This may be termed the compressive phase of operation. When the relative movement of the supported and supporting members is such as to cause the metal member 13 to move upwardly away from member 14, that portion of the rubber structure that is above member 14 is subjected to tension, and that between the sides of bridge-portion 14a and the sides of member 13 is subjected to tension and shear. Furthermore, a relatively small portion of the rubber structure that is disposed below the bottom of bridge-portion 14a and the cross piece of bolt 16 will be subject to compressive strain. This may be termed the tension phase of operation. Because the finger-like portions 13b and side-walls 13a of the metal member 13 are disposed laterally of bridge-portion 14a, relative lateral movement of members 13, 14, either axially of the engine 10 or in a direction transversely thereof, will be resisted by the rubber structure 15, which thereby is put partly under compressive strain and partly under tension and shear stresses. The portions 13b and side-walls 13a are so arranged that the corners of the box-like member 13 are open, as is the region between adjacent portions 13b, the arrangement providing ample space for deformation or displacement of the rubber of body 15 when under compressive load.

Figure 6:
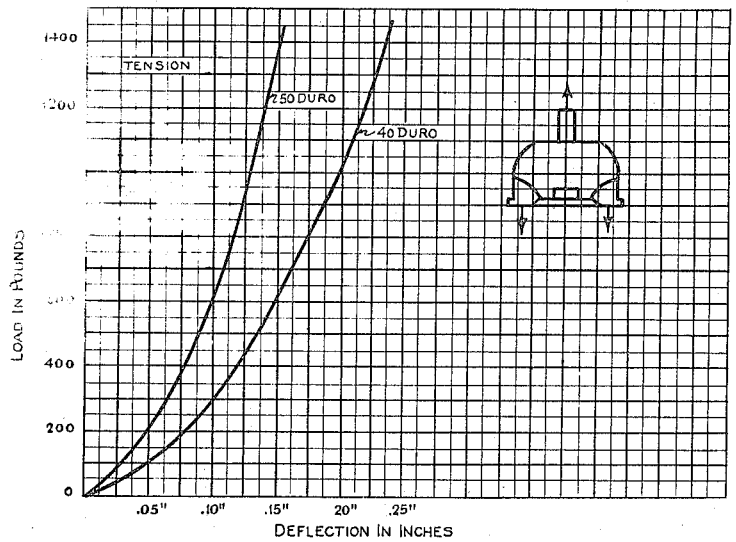

The improved support offers an increasing rate of resistance to deformation both in the compression and tension phases of operation, as is graphically shown in Figures 5 and 6 respectively. Each graph shows the values obtained by the use, in the resilient supports, of rubber stocks of two different degrees of hardness as measured by the Shore durometer.

The invention obviates some of the undesirable features present in resilient mountings of prior constructions, and it achieves the several advantages set out in the foregoing statement of objects.

Modification may be resorted to without departing from the spirit of the invention or the scope of the appended claims.

What is claimed is:

1. In a resilient support, the combination of an upper metal member of box-like shape open at its bottom, a lower metal member disposed transversely thereof and having an offset portion disposed within the box-like structure, a body of resilient rubber composition disposed interiorly of said box-like structure and surrounding the offset portion of the lower metal member, and means for attaching said metal members respectively to a supported and a supporting structure, the means for attaching the box-like member extending through the offset portion of the lower metal member, in spaced relation thereto and engaging the box-like structure, said structure and said means being in surrounding relation with respect to said offset portion to effect a mechanical interlock of said members.

2. In a resilient support, the combination of a metal member of box-like shape open on one side, a second metal member extending across the open side of said first mentioned member and formed with an offset, bridge-like medial portion extending into said box-like member, a body of resilient rubber composition disposed interiorly of said box-like member and surrounding the bridge-like portion of the second metal member and bonded by vulcanization to both metal members, and a third metal member engaging opposite sides of the box-like member and disposed transversely of the bridge-like portion of the second metal member so as to provide a mechanical interlock of the first and second metal members, said third metal member being integrally formed with a threaded bolt that projects at right angles thereto through the rubber and metal members and adapted for attachment to a structure exteriorly thereof.

3. In a resilient support, the combination of a metal member of box-like shape open on one side, a second metal member extending across the open side of said first metal member and formed with an offset, bridge-like medial portion extending into said box-like member, a body of resilient rubber composition disposed interiorly of said box-like member and surrounding the bridge-like portion of the second metal member and being vulcanized to both of them, and a T-shaped bolt extending through the metal and rubber structure, the cross-piece of the bolt spanning the open side of the box-like structure, in spaced relation to the bridge-like portion of the second metal member therein, and engaging the opposite lateral walls of the box-like structure.

4. In a resilient support, the combination of a metal member of box-like shape open on one side and formed with a central aperture, a second metal member extending across the open side of said box-like member and formed with a bridge-like medial portion extending thereinto, said bridge portions being formed with an aperture that is in axial alignment with the first mentioned aperture and of larger size, a body of resilient rubber disposed interiorly of said box-like member and surrounding the bridge-like portion of the second metal member and bonded by vulcanization to both metal members, there being a bore in said rubber body that extends from the aperture in the box-like member, through the aperture in the bridge-portion, and opening into a slot formed in the rubber body transversely thereof, and a T-shaped bolt removably mounted in said bore, the cross-piece of the bolt being receivable in said slot.

ELLWOOD F. RIESING.